United States Patent [19]

Caron et al.

[11] Patent Number: 5,050,951

[45] Date of Patent: Sep. 24, 1991

[54] OPTICAL MATRIX SWITCH WITH LONGITUDINALLY CONFIGURED SWITCH ELEMENTS

[75] Inventors: Bernard G. Caron, Harrisburg; Dennis R. Leber, Manchester; Paul R. Reitz, Palmyra, all of Pa.

[73] Assignee: AMP Incorporated, Harrisburg, Pa.

[21] Appl. No.: 520,350

[22] Filed: May 8, 1990

[51] Int. Cl.[5] .............................................. G02B 6/28
[52] U.S. Cl. ........................................ 385/17; 385/24
[58] Field of Search ............... 350/96.13, 96.15, 96.16; 455/601, 600

[56] References Cited

U.S. PATENT DOCUMENTS

| | | | |
|---|---|---|---|
| 4,787,692 | 11/1988 | Spanke | 350/96.16 |
| 4,822,124 | 4/1989 | Suzuki | 350/96.11 |
| 4,852,958 | 8/1989 | Okuyama et al. | 350/96.13 |
| 4,854,660 | 8/1989 | Gutterman et al. | 350/96.18 |

FOREIGN PATENT DOCUMENTS

| | | |
|---|---|---|
| 0299604 | 1/1989 | European Pat. Off. . |
| 62-125795 | 6/1987 | Japan ............ 350/96.2 |

*Primary Examiner*—Frank Gonzalez
*Assistant Examiner*—John Ngo

[57] ABSTRACT

An optical matrix switch has N input ports and M output ports and M×(M−1) number of 1×2 fiber optics switch elements and M×(N−1) number of 2×1 fiber optic switch elements.

6 Claims, 2 Drawing Sheets

OPTICAL MATRIX SWITCH WITH LONGITUDINALLY CONFIGURED SWITCH ELEMENTS

FIELD OF THE INVENTION

The invention relates to an optical matrix switch and, more particularly, to an optical matrix switch with longitudinally configured switch elements.

BACKGROUND OF THE INVENTION

Optical matrix switches are useful in optical communication networks wherein large quantities of data are transmitted through optical fibers at high speed. An output optical signal from one of the input optical fibers, each of which is connected to an optical matrix switch, can be supplied to a selective one of output optical fibers also connected to the switch.

Optical switching provides certain advantages over electronic switching techniques; and, oftentimes, optical matrix switches are utilized in electronic transmission lines by converting an electrical signal to an optical signal, passing the signal through the matrix switch and converting the optical signal back to an electronic signal. The advantages of utilizing an optical matrix switch include greatly increased band width and rapid switch configuration rates.

Spanke, U.S. Pat. No. 4,787,692, teaches optical switch networks and design rules for creating the same. The networks comprise a plurality of input and output stages of optical switch elements. Each input optical switch stage is comprised of a plurality of $1 \times 2$ optical switch elements, and each output stage is comprised of a plurality of $2 \times 1$ switch elements. The Spanke patent points out that with its invention utilizing such switch network and layout in interconnection, a non-blocking network is achieved having good signal to noise characteristics without crossover and crossthrough limitations as in prior art networks.

Suzuki, U.S. Pat. No. 4,822,124, represents an advancement to the matrix switch of the Spanke patent. As the Suzuki patent points out, with the conventional optical matrix switch, the size thereof is inevitably large in its longitudinal direction. Thus, for example, where the optical switch is provided with four inputs and four outputs to be called a "$4 \times 4$ Optical Matrix Switch", four rows of optical switch elements must be included. Therefore, the longitudinal length cannot be less than a length as much as four times the longitudinal dimension of the optical switch element. In accord with the Suzuki patent, a stage of $2 \times 2$ optical switch elements is provided in place of two intermediate stages of $1 \times 2$ and $2 \times 1$ switch elements to thereby result in an optical switch smaller in the longitudinal direction.

Both prior art patents utilize switching elements based on a Ti-LiNbO$_3$ substrate. The interconnection of stages of the input and output sections includes optical crossovers and crossthroughs diffused in the same substrate in which the switch elements are formed. The Suzuki patent indicates that, as a result, the substrate on which the four rows of optical switch elements are provided must be large in surface area, thereby substantially increasing fabric casing costs. With $2 \times 2$ group switch means in the center stage of a switching matrix, the total number of switches otherwise required is decreased, and consequently the number of optical crossovers and crossthroughs is decreased. Thus, for example, in Spanke, a $4 \times 4$ matrix switch would be constructed using a stage 2 consisting of eight $1 \times 2$ switches, a stage 1 adjacent to input ports of four $1 \times 2$ switches, a stage 3 of eight $2 \times 1$ switches, and a stage four of four $2 \times 1$ switches, each connected to an associated output port. With Suzuki, the total of sixteen switches in the intermediate stages 2 and 3 would be replaced by a total of four $2 \times 2$ switch means, thereby resulting in a matrix switch with a total of twelve switching elements. Again, as with Spanke, the switching elements are Ti-LiNbO$_3$ substrate based switches.

The present invention takes advantage of advances in the fiber optics switching art. As pointed out above, both the Spanke and Suzuki patents utilize switching elements based on a Ti-LiNbO$_3$ substrate. As both patents point out, with such switching elements, the longitudinal length of the matrix switch becomes critical. However, advances in the fiber optic switching art make possible the providing of discrete fiber optic switches which may be combined to form matrix switches wherein the longitudinal length is not of the criticality of matrix switches utilizing the substrate switches of the prior art. Further, the discrete fiber optic switches make possible matrix switches having switching elements arranged in a longitudinal configuration from input ports to output ports. Matrix switches of such configuration are improved in that any connection between an input port and an output port may be made with an activation of a minimum number of switching elements This not only decreases power requirements for the activation of matrix switches—which requirements may be substantial with switches having large numbers of input ports and output ports, for example, on the order of 64 input ports and 64 output ports—but further is advantageous in that, permitted, is a simplified and easier power switching arrangement for the connection of the optical matrix switch grid to the power controller.

Switching elements useful in the matrix switches of the present invention are those taught by Gutterman, et al., U.S. Pat. No. 4,854,660, and Kokoshvill, U.S. Pending Application, Ser. No. 053,220, entitled "Fiber Optic Bypass Switch", filed on May 13, 1987, having European priority EP 0 299 604 A1. The switch elements of the matrix switches of the present invention include an imaging system having a symmetry such as a spherical reflector. The switch also includes a group of optical fiber end faces including at least a first optical fiber end face via which light is transmitted to the imaging system and at least a second end face which transmits light away from the imaging system. A translation mechanism is provided for linearly translating the imaging system and the fiber end face group relative to one another between two positions. With a $1 \times 2$ switch element, in a first position, the first and second fiber end faces are conjugate with respect to the symmetry of the imaging system so that light from the first fiber is imaged by the imaging system into the second fiber. In a second position, the first and third fiber end faces are conjugate with respect to the symmetry of the imaging system so that light from the first fiber is imaged by the imaging system into the third fiber. Thus, it is possible to switch the light from the first fiber into the second fiber or into the third fiber depending on the position of the linear translation mechanism. With a $2 \times 1$ switch element, in the first position, the first and third fiber end faces are conjugate with respect to the symmetry of the imaging system so that light from the first fiber is imaged by the imaging system into the third fiber. In the second position, the second and third fiber end faces are conjugate with respect to the symmetry of the imaging systems so that light from the second fiber is imaged by the imaging system into the third fiber. Thus, it is possible to switch the light from either the first fiber or the second fiber into the third fiber depending upon the position of the translation mechanism.

SUMMARY OF THE INVENTION

The present invention relates to an optical matrix switch having N input ports and M output ports where N and M each is an integer. The optical matrix switch has $N \times (M-1)$ number of $1 \times 2$ fiber optic switch elements with each number 1/N of the total of such $1 \times 2$ switch elements being associated with a respective input port. Further, the optical matrix switch has $M \times (N-1)$ number of $2 \times 1$ fiber optic switch elements with each number 1/M of the total number of such $2 \times 1$ switch elements being associated with a respective output port. Each of the number 1/N of the total of the $1 \times 2$ switch elements is arranged longitudinally therefrom a respective input port with each of the $1 \times 2$ switch elements connected via a fiber optics transmission line to the input port or to a preceding $1 \times 2$ switch element. Each of the number 1/M of the total of such $2 \times 1$ switch elements is arranged longitudinally therefrom the respective output port with each of the $2 \times 1$ switch elements connected via a fiber optics transmission line to the output port or to a preceding $2 \times 1$ switch element. Each of the $1 \times 2$ fiber optic switch elements is connected to at least one of the $2 \times 1$ switch elements and each of the $2 \times 1$ switch elements is connected to at least one of the $1 \times 2$ switch elements. In an embodiment of the present invention, the matrix switch may have N number of input ports and N number of output ports. With this configuration, the optical matrix switch comprises $2N(N-1)$ number of fiber optic switch elements.

DESCRIPTION OF A PREFERRED EMBODIMENT

Figure 1:
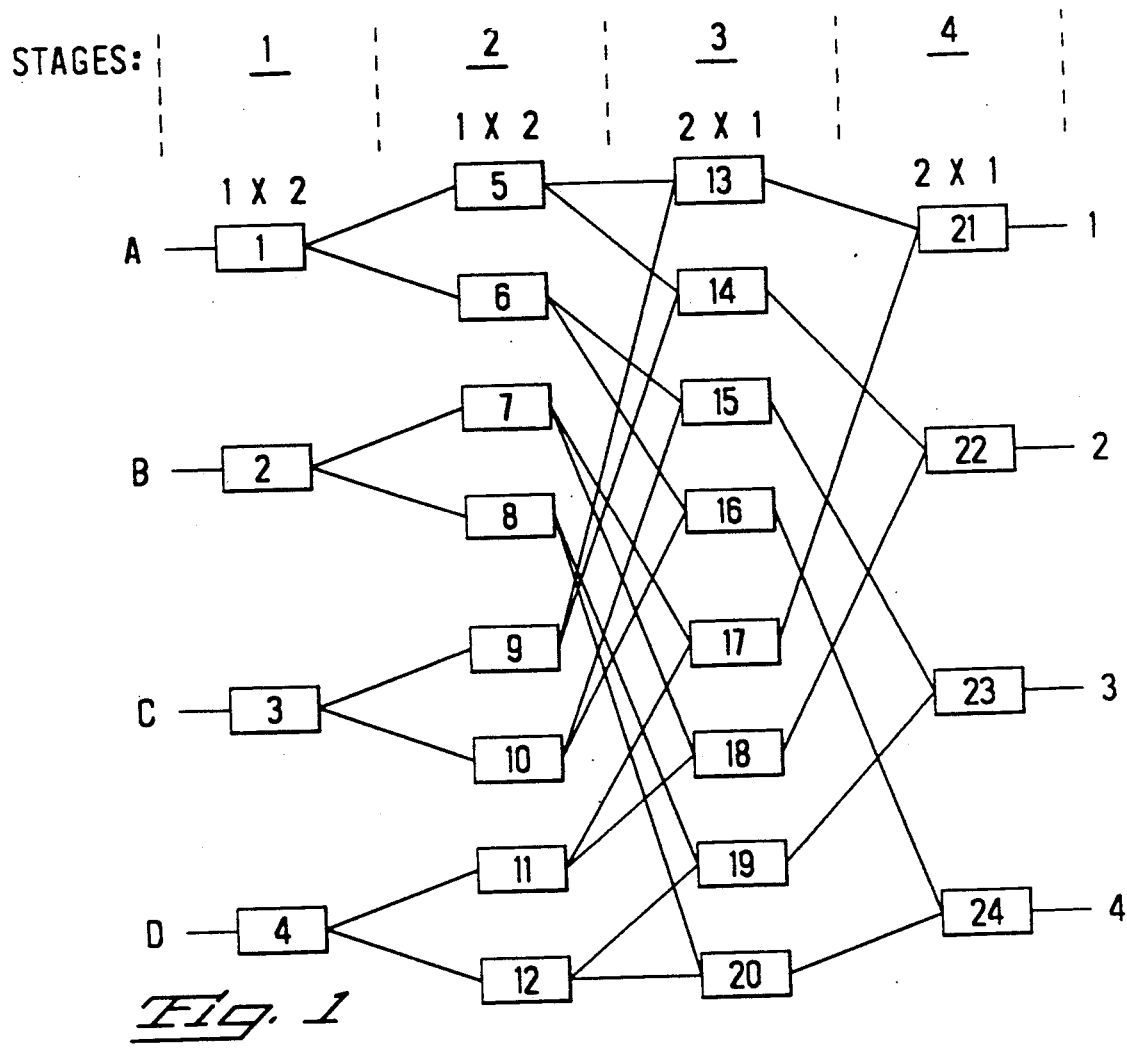
FIG. 1 is a schematic diagram of a $4 \times 4$ optical matrix switch according to Spanke, U.S. Pat. No. 4,787,692.

FIG. 1 is a schematic diagram of a $4 \times 4$ optical matrix switch according to a configuration as defined by the Spanke patent. The optical matrix switch has four input ports (M), labeled A, B, C, and D and four output ports (N), labeled 1, 2, 3, and 4. Switching stages, which are the longitudinal number of switches between the input and output ports, are defined as equal to $\log_2 4 + \log_2 4$ or to $2+2$. Each stage is assigned a number from 1 to 4 in sequence from the input ports to the output ports. Shown in FIG. 1 are such numbered stages. Further, the stage numbered $\text{Log}_2 M$ which is the stage numbered 2, comprises the number $4 \times 4/2$ of optical $1 \times 2$ switch elements or, in other words, a total of eight switch elements (shown numbered 5 through 12 in stage 2). Each stage between the stage of $\log_2 M$ (stage of $\text{Log}_2 4$ = stage 2) and the input ports consists of one-half of the number of switch elements in the next nearer stage to the stage $\log_2 M$ (stage 2). Hence, stage 1 consists of four $1 \times 2$ optical switches labeled 1 through 4. Further, the stage numbered $\log_2 M + 1$ (stage numbered 3) consists of $M \times N/2$ ($4 \times 4/2$ = eight) optical $2 \times 1$ switch elements labeled 13 through 20. As shown, stage 3 has eight $2 \times 1$ switch elements numbered from 1 to 8. Each stage between the stage $\log_2 M + 1$ (stage 3) and the output ports comprises one-half of the number of $2 \times 1$ optical switches. Hence, stage 4 would comprise four of the $2 \times 1$ optical switches labeled 21 through 24, again as shown in FIG. 1.

Figure 2:
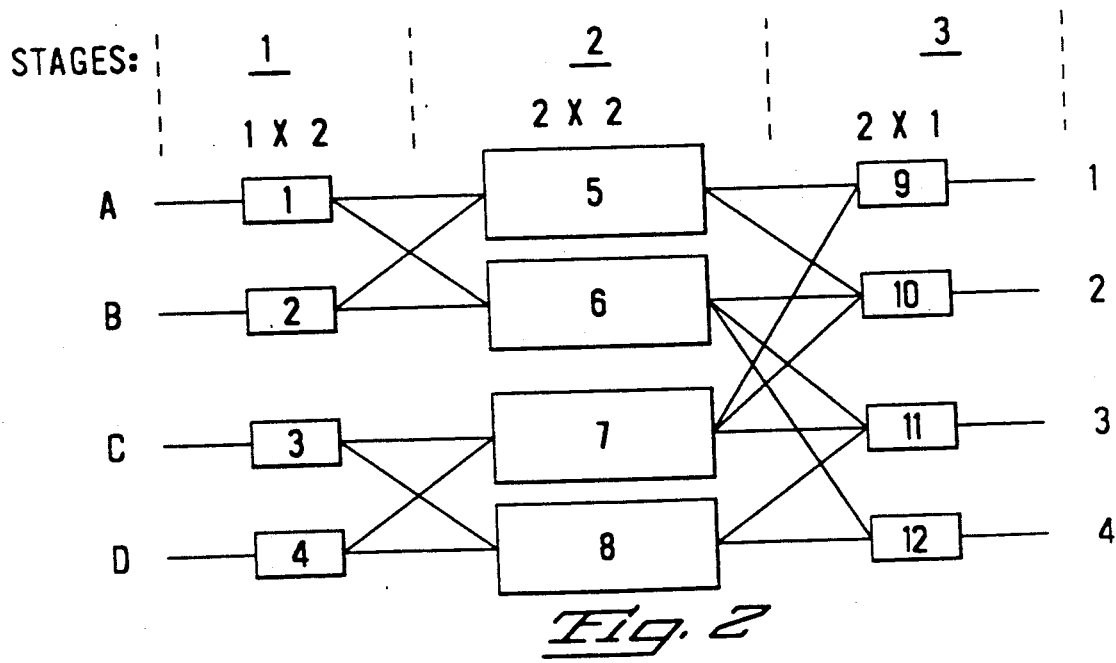
FIG. 2 is a schematic diagram of a $4 \times 4$ optical matrix switch according to Suzuki, U.S. Pat. No. 4,822,124.

With reference to FIG. 2, Suzuki teaches replacing the $1 \times 2$ and $2 \times 1$ switches of stage 2 and stage 3 with four $2 \times 2$ switches numbered 5, 6, 7, and 8 as in FIG. 2. As shown in a $4 \times 4$ configuration, the total switches would be 12 and the number of crossovers and crossthroughs is reduced.

Figure 4:
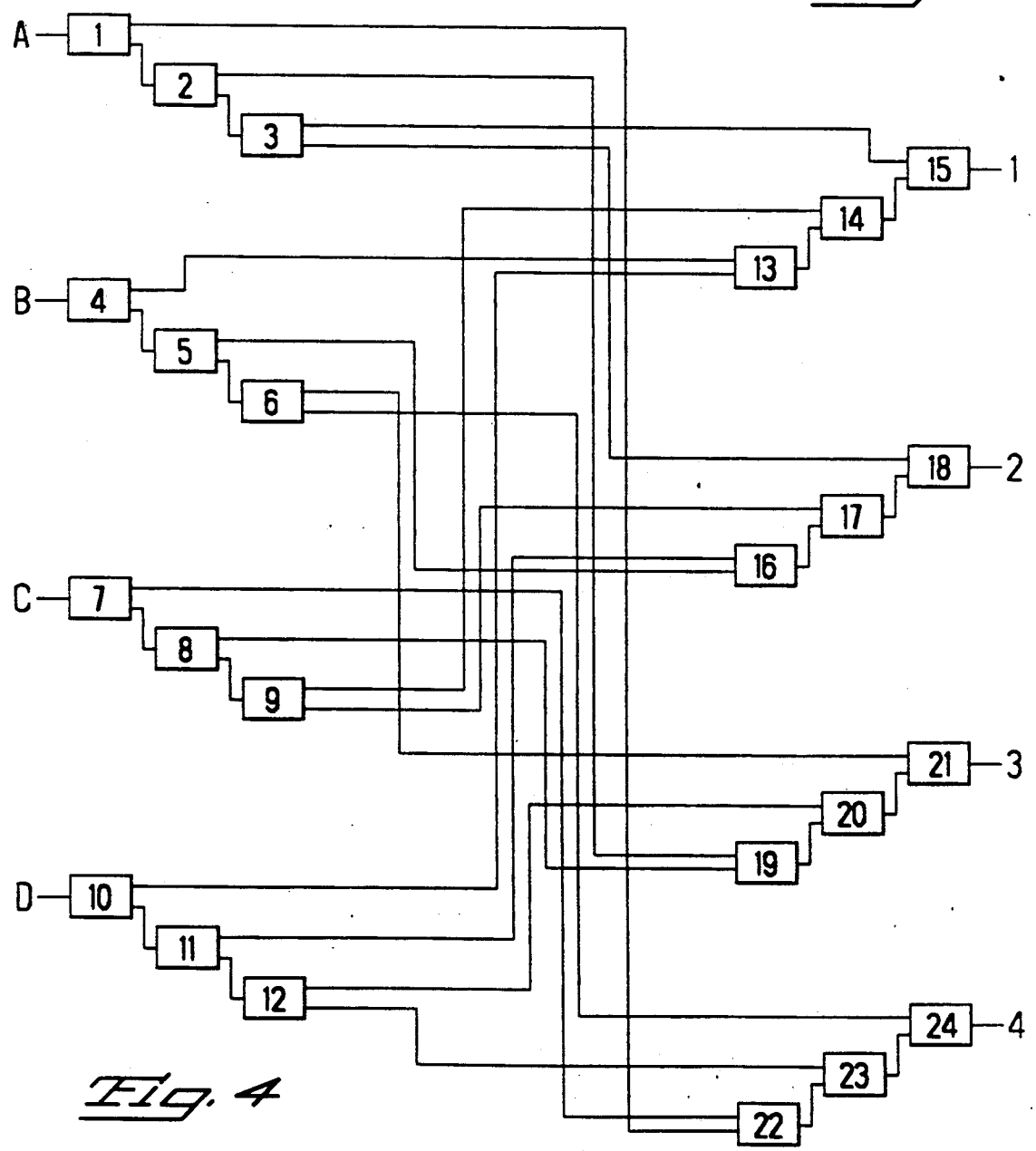
FIG. 4 is a schematic diagram of a $4 \times 4$ optical matrix switch according to the present invention.

FIG. 4 is a schematic diagram of a $4 \times 4$ optical matrix switch according to the present invention. As shown, the switches are configured longitudinally, one from the other, between input port and output port. $1 \times 2$ switches 1, 2 and 3 are associated with input port A; switches 4, 5 and 6 with input port B; 7, 8 and 9 with input port C; and 10, 11 and 12 with input port D. $2 \times 1$ switches 13, 14 and 15 are associated with output port 1; 16, 17 and 18 with output port 2: 19, 20 and 21 with output port 3: and 22, 23 and 24 with output port 4.

In a $4 \times 4$ switch as shown, $(M-1)$ or 3 optical switching elements are connected to one each of N number of input ports directly via a fiber optics transmission line. $N-1$ or 3 number of $2 \times 1$ optical switching elements are connected to one each of N or 4 number of output ports directly via a fiber optics transmission line. The elements of the matrix switch are $N \times (M-1)$ or $4 \times (4-1)$, a total of twelve $1 \times 2$ fiber optic switch elements, and $M \times (N-1)$, a total of twelve number of $2 \times 1$ fiber optic switch elements. Each number of 1/N or ¼, the total number of such $1 \times 2$ switch elements is associated with a respective input port. Thus, ¼ of 12 of such $1 \times 2$ switch elements or 3 of such $1 \times 2$ switch elements is each associated with a respective input port. The number 1/M of the total number of such $2 \times 1$ switch elements is associated with a respective output port. Or, in other words, ¼ of 12 or 3 of such $2 \times 1$ switch elements is each associated with a respective output port. Each of the number of the total of $1 \times 2$ switch elements associated with an input port is arranged longitudinally from the input port with each of the $1 \times 2$ switch elements connected via a fiber optics transmission line to the input port or to a preceding $1 \times 2$ switch element. Each of the number of the total of $2 \times 1$ switch elements associated with a respective output port is arranged longitudinally therefrom the output port with each of the $2 \times 1$ switch elements connected via a fiber optics transmission line to the output port or to a preceding $2 \times 1$ switch element.

With reference to the first and second stages of switches, it is noted that the matrix switch of the present invention may be turned to an "off" power condition thereby removing power from the system so that no light signals transmit from any of the input ports to any of the output ports. This capability is provided by the present invention, but is not available in the configurations of the Spanke and Suzuki patents. Furthermore, it is notable that both Spanke and Suzuki patents recommend configurations longitudinally having a minimum number of stages so as to minimize the number of optical crossovers of optical waveguides which are taught to be diffused in a substrate. The number of crossovers of the present configuration greatly exceed those taught by either Spanke or Suzuki but without the disadvantages of crossover inherent in a matrix comprising waveguides diffused in a substrate. Rather, the present switch matrix consists of discrete 1×2 and 2×1 switches in accord with FIG. 4. Further, with the matrix switch illustrated in FIG. 4, light signals and, hence, communications may be made between a single input port to a single output port by activation of a minimum number of switching elements. Reference is made to TABLE I which illustrates input ports as A, B, C, and D and output ports as 1, 2, 3, 4. The entries in the table indicate the number of switches which need to be powered into an "on" position in order for a light signal to be transmitted from the indicated input port to the indicated output port.

TABLE I

| D | 13, 14 | 13, 15 | 13, 16 | 13 |
|---|--------|--------|--------|----|
| C | 9, 10  | 9, 11  | 9, 12  | 9  |
| B | 5, 6   | 5, 7   | 5, 8   | 5  |
| A | 1, 2   | 1, 3   | 1, 4   | 1  |
|   | 1      | 2      | 3      | 4  |

Table II follows the same designating convention with respect to the switch elements and identifies the switches required in order to transfer light signals from input ports A, B, C, and D to any one of output ports 1, 2, 3, and 4 in accord with the Spanke patent.

TABLE II

|   | 4, 11       | 4        | 19       | —      |
|---|-------------|----------|----------|--------|
| C | 3, 9, 21    | 3, 22    | 10, 23   | 24     |
| B | 2, 7, 17    | 2        | 8        | 20     |
| A | 1, 5, 13, 21| 1, 14, 22| 6, 15, 23| 16, 24 |
|   | 1           | 2        | 3        | 4      |

Comparing, for example, the light signal transmission path from input A to output 1 of the present invention with the same transmission path of Spanke, it is seen that as many as four switches may be needed to be powered into an "on" position in order to transmit a light signal from input to output with the switch of Spanke, but only a maximum of two switches need to be powered into an "on" position to transmit from input to output via any path according to the switch of the present invention.

Figure 3:
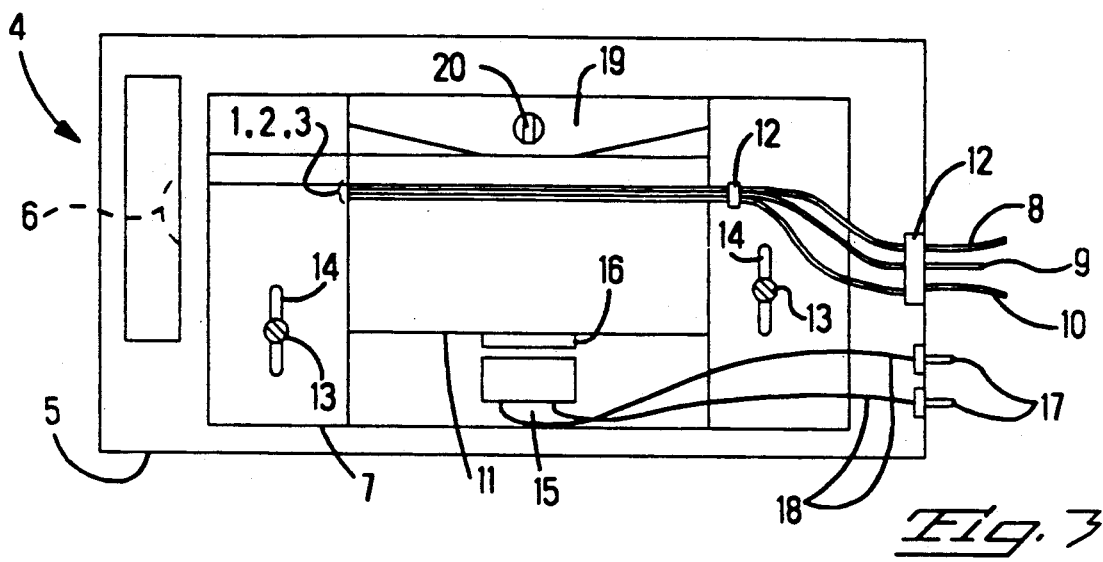
FIG. 3 illustrates one of the switches useable in the present invention.

FIG. 3 schematically illustrates an embodiment of the switch of the present invention shown as a 1×2 switch 4 comprising a base 5. Fixedly mounted on the base 5 is a spherical reflector 6. The switch 4 also includes a subassembly 7. The ends 1, 2 and 3 of a group of optical fibers 8, 9 and 10 are mounted on a movable substrate 11 which forms part of the subassembly 7. The end faces 1, 2 and 3 of the fibers 8, 9 and 10 are oriented towards the spherical reflector 6 and are arranged with respect to the center of curvature of the spherical reflector 6 so that the spherical reflector 6 provides optical paths between certain fiber pairs. More particularly, the end faces 1, 2 and 3 are arranged into a group of two and a group of one. The fibers are maintained in position by the support structures 12.

The end faces of the fibers may be polished or cleaved. Polished end faces are provided by a polishing operation to all the fiber ends after the fiber ends have been positioned on the substrate 11. The advantage of cleaved end faces is that the fibers may be assembled in precisely defined positions on the substrate 11.

Screws 13 are mounted in slots 14 and are used for initial alignment of the subassembly 7 with respect to the reflector 6. More particularly, when the screws 13 are loosened, the slots 14 serve as guides for the subassembly 7. Once initial alignment is achieved, i.e. once the subassembly is positioned for a first switching state, the screws 13 are tightened.

To move the switch from a first switching state to a second switching state (i.e. a state in which optical paths are provided between different pairs of fibers than in the first switching state), a solenoid 15 and magnet 16 are used to linearly translate the movable substrate 11. The permanent magnet 16 is mounted to the substrate 11. Illustratively, in the first switching state the solenoid 15 is off. When the solenoid 15 is activated by way of connector 17 and lead 18, the magnet 16 is repelled and the subassembly 7 is moved against adjustable stop 19 so that the second switching state is realized. The position of the stop is adjustable by means of screw 20.

While what has been described with reference to FIGS. 3 and 4 constitutes a presently preferred embodiment of the invention, it should be recognized that the optical matrix switch may take other forms so long as it consists of the longitudinal arrangement of switches as defined by the claims. For example, switches of the present invention could very well be configured with an odd number of input ports and/or an odd number of output ports. Notably, both Spanke and Suzuki specify the number of input ports or a number of output ports as being non-zero powers of 2. Hence, neither Spanke nor Suzuki could provide a fiber optics matrix switch with an uneven number of input ports and/or an uneven number of output ports. Accordingly, it should be understood that the invention is to be limited only insofar as required by the scope of the following claims.

We claim:

1. An optical matrix switch having N input ports and M output ports where N and M each is an integer comprising:

N×(M−1) number of 1×2 fiber optic switch elements with each number 1/N of the total of such 1×2 switch elements being associated with a respective input port;

M×(N−1) number of 2×1 fiber optic switch elements with each number 1/M of the total number of such 2×1 switch elements being associated with a respective output port;

each said number 1/N of the total of such 1×2 switch elements being arranged longitudinally therefrom said respective input port with each of said 1×2 switch elements connected via a fiber optics transmission line to the input port or to a preceding 1×2 switch element;

each said number 1/M of the total of such 2×1 switch elements being arranged longitudinally therefrom said respective output port with each of said 2×1 switch elements connected via a fiber optics transmission line to the output port or to a preceding 2×1 switch element;

with each said 1×2 fiber optic switch elements connected to at least one of said 2×1 switch elements;

and with each said 2×1 fiber switch elements connected to at least one of the said 1×2 switch elements.

2. The optical matrix switch of claim 1 having N input, ports and N output ports comprising two N (N−1) number of fiber optic switch elements.

3. The optical matrix switch of claim 1 having N input ports and N output ports comprising N (N−1) number of 1×2 fiber optic switch elements and N (N−1) number of 2×1 fiber optic switch elements.

4. The optical matrix switch of claim 1 having four input ports and four output ports comprising 12 number of 1×2 fiber optic switch elements and 12 number of 2×1 fiber optic switch elements.

5. The optical matrix switch of claim 1 or claim 4 wherein each 1×2 fiber optic switch element comprises:
an imaging system having a symmetry;
a group of optical fiber end faces including a first optical fiber end face via which light is transmitted to said imaging system and a second and third optical fiber end face via which light is transmitted away from said imaging system;
means for linearly translating the group of fiber end faces relative to one another between a first position and a second position;
in said first position, light from said first fiber end face is imaged into said second fiber end face; and
in said second position, light from said first fiber end face is imaged into said third fiber end face;
and, further, wherein each 2×1 fiber optic switch element comprises:
an imaging system having a symmetry;
a group of optical fiber end faces including a first and second optical fiber end face via which light is transmitted to said imaging system and a third optical fiber end face via which light is transmitted away from said imaging system;
means for linearly translating a group of fiber optic faces relative to one another from a first position and a second position;
in said first position, light from said first fiber end face is imaged into said third fiber end face; and
in said second position, light from said second fiber end face is imaged into said third fiber end face.

6. The switch of claim 5 wherein said imaging system is a spherical reflector.

* * * * *